A. J. BURNS.
FRUIT PARER, CORER, AND DIVIDER.
APPLICATION FILED DEC. 11, 1905.
915,658.
Patented Mar. 16, 1909.
2 SHEETS—SHEET 1.
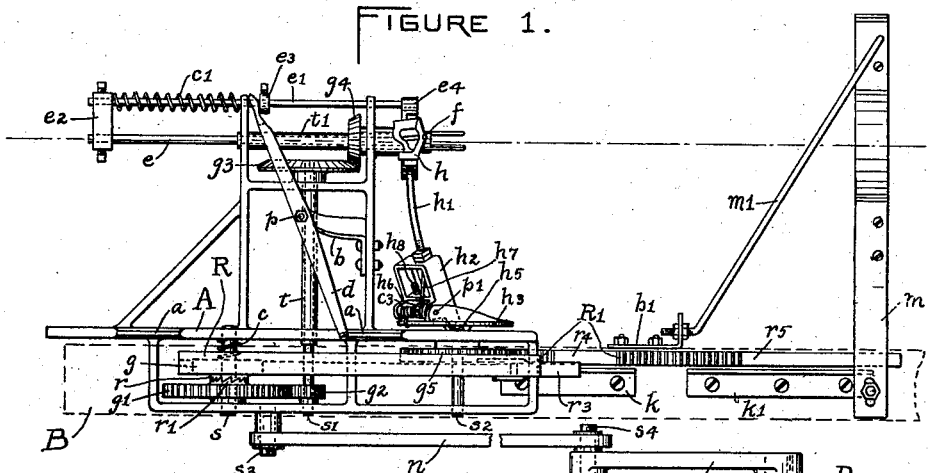
WITNESSES:
Albert C. Bell
Clara M. Sinner
INVENTOR:
Albert J. Burns.
By W. H. Cooley
ATTY.

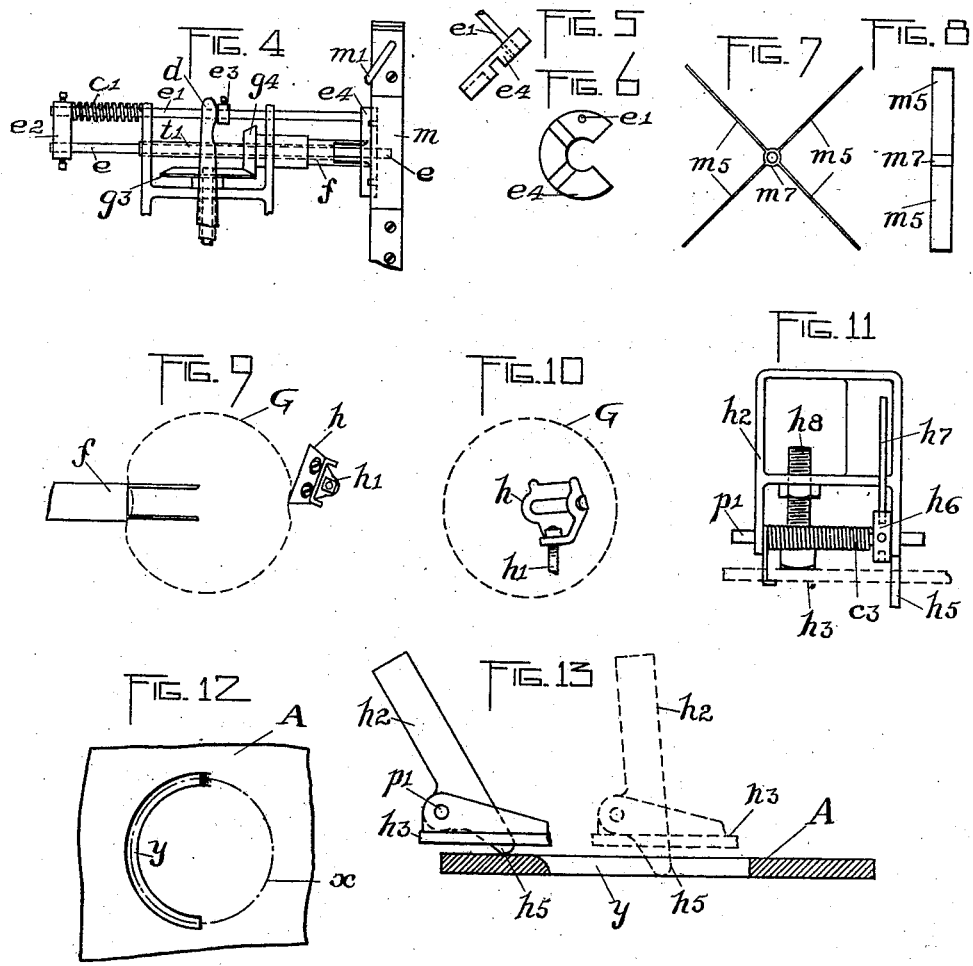

UNITED STATES PATENT OFFICE.

ALBERT J. BURNS, OF ROCHESTER, NEW YORK, ASSIGNOR OF ONE-HALF TO FREDERICK D. H. COBB, OF ROCHESTER, NEW YORK, AND ONE-HALF TO COBB PRESERVING COMPANY, OF ROCHESTER, NEW YORK, A CORPORATION OF NEW YORK.

FRUIT PARER, CORER, AND DIVIDER.

No. 915,658.        Specification of Letters Patent.      Patented March 16, 1909.

Application filed December 11, 1905. Serial No. 291,175.

*To all whom it may concern:*

Be it known that I, ALBERT J. BURNS, a citizen of the United States, residing at Rochester, in the county of Monroe and State of New York, have invented a new and Improved Fruit Parer, Corer, and Divider, of which the following is a specification.

This invention relates to machines such as are used for paring, coring and cutting or dividing fruit and has especial reference to means for more effectually paring the fruit and for coring it and also dividing it into segments, such as quarters.

The purpose of my present invention is to provide then a machine which shall be adapted to paring the fruit and having therein also a coöperating mechanism adapted to core the fruit and also to divide the fruit into suitable sections all with one handling of the fruit, that is, to combine in a single machine coöperatively the mechanism for performing, each one, in its proper order and succession, the several operations just above enumerated.

Essential features of my present invention are means for arresting the travel of and rigidly holding the paring knife when the same is opposite the usual impaling or carrying fork found in such machines and with the knife so located angularly relatively to the axis of the fork that one end of the knife is adapted to pare the fruit in the end cavity thereof, as for instance in the case of an apple, the knife at this time is so adjusted and held automatically that it will remove the skin from the cavity in the blow end of the apple and for this purpose during one revolution of the apple the paring knife remains in this position after which it is advanced around the surface of the apple in the usual way. After the apple has been pared I provide a stripper for removing the apple from the carrying fork, and arranged to coöperate with the stripper and to move relatively thereto and also relatively to the apple just after it has been pared, I provide a coring device comprising a tube of suitable diameter for cutting out the core of the apple and radiating outwardly from this core-cutting tube I provide a series of dividing knives adapted to cut the fruit into segments, the angularly disposed planes of which would meet in a line practically constituting the axis of the fruit when pared, or the axis of rotation of the fruit upon the carrying fork, and this in the case of apples is usually the axis connecting the stem and the center of the blow end of the apple. Of the dividing knives there may be any desired number, usually four adjusted to divide the fruit into quarters. Coöperating with the stripper I provide means to assist in the removal of the core from the tubular corer located at the center of the dividing knives.

It is of course immaterial whether the apple after being stripped from the carrying fork is forced through the dividing knives and the corer by a motion of the corer or by a motion of the stripper, the essential feature being such a relative motion between, preferably the stripper as it forces the apple from the fork, and the coring and dividing knives as will result in forcing the apple through such coring and dividing knives.

In the accompanying drawings I have shown my invention as adapted to and embodied in an apple paring machine in which a reciprocating carriage has revolubly supported therein the shaft carrying the impaling fork for receiving the fruit and also the shaft upon which is carried, in substantially the usual manner, the base for the paring knife. In my machine the carriage is moved in one direction during the paring of an apple and then returned to its initial position before placing another apple on the impaling fork. In such a machine I provide means for removing the apple just at the completion of the forward stroke of the carriage, and for this purpose I arrest the motion of the paring fork in order that such fork may be held stationary while the apple is being stripped therefrom and forced through the dividing knives and corer. In adapting the dividing knives and corer to a paring machine of the style just above described, I have preferred to make use of a stationary coring and dividing mechanism, rigidly supported from the frame of the machine. Coöperating with this dividing and coring knife I have provided means whereby at the proper time the apple as it is forced from the fork by the stripper is also forced through the corer and divider by means of a relative motion between the stripper or suitable forcing mechanism and the corer and divider operating, while the apple is supported concentrically with the corer and divider, to force the apple therethrough.

The accompanying drawings show only such parts of a machine of the character and style above indicated, as are necessary to illustrate that modification of my invention adapted to embodiment therein.

The drawings are as follows:—Figure 1 shows in top view the reciprocating carriage of my machine, as well as the means for driving the same. In this figure there is also indicated in dotted lines a part of the frame work of the machine. Fig. 2 shows in full lines the position of the driving gear for the initial position of the reciprocating carriage, which is shown in this figure in dotted lines. Fig. 3 shows in end view from the left, the parts seen in Fig. 1 and shows the driving mechanism in dotted lines. Fig. 4 is a top view of the coring and dividing mechanism and shows the action of the stripping mechanism when the reciprocating parts have been moved to their extreme right hand position, that is, the position nearest to the dividing and coring mechanism. Figs. 5 and 6 are details of the stripping mechanism. Figs. 7 and 8 are face and edge views of the dividing and coring knives. Figs. 9 and 10 show in top and end views respectively in dotted outline an apple impaled upon the fork and with the knife at its initial position during the paring operation, in which position it remains during at least one complete rotation of the apple. Fig. 11 shows in side view the pivotally supported and spring actuated frame carrying the paring knife. Fig. 12 is a top view of the cam for controlling the position of the paring knife and Fig. 13 is a developed view of the cam taken along the broken circle $x$.

Similar letters refer to similar parts throughout the several views.

Referring to Figs. 1, 2 and 3, A is the reciprocating carriage and in suitable bearings formed therein are supported shafts $s$ and $s^1$ having thereon coöperating gears $g^1$ and $g^2$. Upon the gear $g^1$ is formed a ratchet $r^1$ engaging a similar ratchet $r$ formed on the gear $g$ otherwise freely rotatable upon the shaft $s$ and engaged by rack R by which such gear $g$ is driven as the carriage A reciprocates. The rack R is rigidly secured to the member B of the frame-work of the machine. Shaft $s^1$ is revoluble in a bearing formed therefor by the tube $t$ supported horizontally within and by the carriage A, and has rigidly secured at its upper end, as seen in Fig. 1, a beveled gear $g^3$ meshing with the beveled gear $g^4$ carried by a tubular shaft $t^1$ in suitable bearings in the carriage A, while on the right hand end of this shaft $t^1$ is secured a fork $f$ for supporting the fruit to be pared.

A suitable stripping mechanism is provided for removing the fruit from the fork at the proper time consisting in the rod $e$ within the tube $t^1$ and the segmental collar $e^4$ partially surrounding the fork and rigidly secured to the right hand end of the rod $e^1$, as seen in Figs. 1 and 4. The rods $e$ and $e^1$ are connected at their left hand ends by a suitable yoke $e^2$ and set screws, as indicated, and are moved to the right against the action of the spring $c^1$ by the lever $d$, pivotally supported at $p$ on a bracket $b$ from the carriage A, engaging a collar $e^3$ secured on the rod $e^1$. The carriage A carries also in suitable bearings a shaft $s^2$ to which there is secured a gear $g^5$, operated intermittently during the reciprocation of the carriage A by a rack $R^1$, which results in an intermittent rotation of the circular base for the paring mechanism rigidly secured to shaft $s^2$. The paring mechanism itself in my machine is quite similar to that found in other machines of this same general class and consists in the circular base piece $h^3$ secured on the upper end of the shaft $s^2$ and immediately above the bearing therefor, not seen, in the carriage A of the machine. This base piece $h^3$ carries ears, preferably cast integrally therewith, as seen, and between which there is pivotally supported a frame $h^2$ upon a pin $p^1$ extending through and secured in such ears. Secured in the upper end of this frame $h^2$ is seen a rod $h^1$ for carrying the paring knife in the manner to be explained later. This frame $h^2$ has a portion thereof $h^5$, as indicated in Figs. 1, 11 and 13, extending downwardly through a suitable opening $y$ therefor in the base $h^3$, and engages, during a part of the rotation of the shaft $s^2$, the carriage A underneath the circular base $h^3$. A portion of such carriage A is, however, cut away underneath the base $h^3$ to produce a cam surface for engagement by the downward extension $h^5$ on the frame $h^2$, to operate the frame $h^2$ in such a way as to cause the knife to properly engage the apple during the desired portion of the rotation of the shaft $s^2$. Referring now to Figs. 12 and 13,—the carriage A comprises a cam for engaging the projection $h^5$ to force the paring knife out of engagement with the fruit except where such arm $h^5$ extends through the semicircular opening $y$ therefor, permitting the spring $h^5$ to force the arm $h^2$ toward the position indicated therefor in dotted lines in Fig. 13. As seen in Fig. 11, a torsional spring $c^3$ is provided for pressing the knife firmly in engagement with the fruit to be pared. One end of this spring engages the circular plate $h^3$ and the other end engages a collar $h^6$ supported on the rod $p^1$, which collar has in its periphery a number of holes for adjusting the pressure exerted by this spring, through the rod $h^7$ inserted in one of such holes, upon the frame $h^2$ and thereby also the pressure of the paring knife upon the fruit. A suitable adjustable screw stop $h^8$ is provided for limiting the motion of the frame $h^2$ when there is no fruit on the fork.

The gearing just described is operated in the following manner. The carriage A has four slides $a$ arranged to travel longitudinally of the machine in guideways $a^1$, seen in Fig. 3, secured to the members B and $B^1$ of the frame of the machine. The carriage A is reciprocated in these guideways by means of the link $n$ articulating at one end with the stud $s^3$ carried by the carriage A and at the other end with the crank pin $s^4$ carried by crank $q$, which in turn is secured to shaft $s^5$ supported in a suitable bearing D on the member C of the frame of the machine, such shaft $s^5$ being driven by a pulley E, as indicated in Fig. 1. The path described by the crank pin $s^4$ is indicated in Fig. 2 by the dotted arc W.

Racks R and $R^1$ are rigidly secured to the members B and $B^1$ of the frame of the machine and thus the gears meshing with such racks are caused to rotate as the carriage A reciprocates in its guideways $a^1$ and thus the fruit carried by the fork $f$ and the knife for paring the same are rotated in the manner usual in paring machines. In my machine, however, I provide that after the paring knife has been advanced through about half of its forward motion, during which time it is held out of contact with the fruit by the downward extension $h^5$ on the frame $h^2$ engaging the carriage A, it is prevented from further rotation by means of a delay surface $v^1$, as seen in Fig. 2, engaging a delay surface $r^4$ upon the rack $R^1$ and at the same time a second delay surface $u^1$ secured to the side of the gear $g^5$ engages a coöperating delay surface $k$ carried by the member $B^1$ of the frame of the machine. The gear $g^5$ is prevented from rotating while the shaft $s^2$ travels from the position indicated at $s^6$ to the position indicated at $s^7$ in Fig. 2 and the position of the delay surfaces carried by the gear $g^5$ during this interval of rest is indicated at $u^2$ and $v^2$. During this interval the fruit carried by the fork $f$ is rotated once by means of the gear $g$ already described, such rotation being continuous during the motion to the right, as long as the rack R and gear $g$ are in engagement. After the fruit has rotated once with the knife at rest and opposite the outer end thereof, as shown in Figs. 9 and 10, that is, with the shaft $s^2$ and gear $g^5$ in the position indicated at $s^6$ and $s^7$, the rack $R^1$ again engages the gear $g^5$ and carries the knife around the fruit, the knife at this time being held in contact with the fruit by the spring $c^3$, since the downward extension $h^5$ is out of engagement with the carriage A of the machine. This rotation continues until the knife has passed around the fruit and completely peeled the same at which time a delay surface $v$ carried by the gear $g^5$ engages a corresponding delay surface $r^5$ carried by the rack $R^1$ and this, together with a simultaneous engagement by a delay surface $u$ also carried by the gear $g^5$ with delay surface $k^1$ carried by the member $B^1$ of the frame of the machine, prevents further rotation of the knife carrying mechanism. The position of the shaft $s^2$ at the beginning of the engagement of these delay surfaces is indicated at $s^8$, while the extreme right hand position of the shaft $s^2$ for which these delay surfaces are still in contact is indicated at $s^9$. For these positions $s^8$ and $s^9$ corresponding positions of the delay surfaces $v$ are indicated at $v^3$ and $v^4$. The delay surfaces $u$, $u^1$, $k$ and $k^1$ necessitate a definite relation angularly of the gear $g^5$ relatively to the rack $R^1$ since they coöperate during the whole of the peeling operation and thus more effectually prevent the gear and rack from springing out of engagement than would the delay surfaces $v$, $v^1$, $r^4$ and $r^5$ alone. The position of the knife while the delay surfaces $v^1$ and $u^1$ are in engagement with delay surfaces $r^4$ and $k$ respectively, is indicated in Figs. 9 and 10, in which the apple is represented in dotted outline at G and the knife is shown at $h$ opposite the outer end of the fruit. While the shaft $s^2$ is passing from the position indicated at $s^8$ to $s^9$, the gear $g$ is out of mesh with the rack R since the rack R is so placed relatively to the gear $g$ that at the same time the delay surfaces $u$ and $v$ contact with the delay surfaces $k^1$ and $r^5$ respectively, the gear $g$ moves out of engagement with the rack R and to the right therefrom and therefore neither the fork $f$ nor the paring mechanism is rotating during this period but the knife occupies a position on the under side of the fork $f$ practically below the starting position indicated in Fig. 1. This is so the fruit may be engaged by the knives $m^5$ and coring mechanism $m^7$ carried by the supporting arms $m$, $m^2$, $m^3$ and $m^6$ from the members B and $B^1$ of the frame of the machine. These supporting arms are suitably braced by means of bent bolts $m^1$ and $m^4$ secured to brackets $b^1$ and $b^2$, in turn secured to the members B and $B^1$ respectively. The bracket $b^1$ is arranged so the lever $d$ will engage its outstanding portion at practically the time the delay surfaces $v$ and $u$ engage the delay surfaces $r^5$ and $k^1$ respectively, and as the carriage A is further moved to the right the stripping mechanism $e$ and $e^4$ is operated and the fruit is moved to the right from the fork $f$ and into engagement with the knives $m^5$ and coring tube $m^7$ and this motion continues until the fruit is entirely removed from the fork and passes entirely beyond the cutting edges of the knives. The rod $e$ operates to remove the core from the tube $m^7$ and thus prevent any clogging or stringing action that might occur. The stripper $e^4$ has suitable grooves provided in it, as indicated in Figs. 5 and 6, to permit its outer face to pass beyond the cutting edges of the knives $m^5$. The knives $m^5$ and the coring tube $m^7$ may be united in any suitable way and are clamped between the supporting arms $m$, $m^2$, $m^3$ and $m^6$ by suitable bolts, as indicated, arranged to take the thrust exerted upon the knives and tube by the coring and dividing operation. When the carriage A and the parts carried thereby are moved from right to left after having completed one paring, coring and dividing operation, proper engagement is made certain between the gear $g$ and rack R by means of a latch $r^3$ pivoted to the rack R at $p^2$ and carrying on its under surface teeth of pitch corresponding to the rack R. This provides that if the gear $g$ does not properly engage the teeth of the latch $r^3$, such latch will lift and permit the teeth of the gear to pass beneath it until they come into engagement and thus a proper meshing of the gear $g$ and rack R is necessitated. A projecting arm $r^6$ is provided on the latch $r^3$ so the latter will not drop too low to properly engage the gear $g$ as it returns to the starting point. As the gear $g$ moves from right to left on the rack R, it causes the ratchet wheels $r$ and $r^1$ to slip by each other against the action of the spring $c$ so the fork $f$ is not rotated during this part of the operation of the machine. During this motion of the carriage A the spring $c^1$ operates to return the stripping mechanism to its initial position.

The operation of my machine is as follows:—
By means of suitable motion communicated through the pulley E, the carriage A and parts carried thereby are reciprocated and motions of the character already described are imparted to the paring knife and the fruit supporting fork $f$ and while the carriage is moving from right to left, as seen in Fig. 1, the fruit to be pared is placed upon the fork $f$, then as the carriage moves from left to right the fruit is rotated and the knife brought into engagement therewith, first at the outer end, in which position it remains stationary during one rotation of the fruit, and then it passes around the surface of the fruit so as to entirely peel the same. Then the driving mechanism for rotating the fruit being out of engagement, the fruit is forcibly pressed against the dividing and coring mechanism by the stripper, as already indicated, which results in completely severing the several portions of fruit, one from the other, and removing the core from the center thereof.

The operation of the paring knife $h$ in my machine is substantially the same as in any machine in this class. It is to be noted however, that when the knife reaches that point in its course where it is opposite the outer or blow end of the fruit on the fork, its travel around the fruit is arrested and it is held in engagement with the fruit during at least one rotation of the fruit in order to more effectually remove the skin from the blow end, and there after the knife progresses around the fruit and remains in engagement therewith even after the carrying fork has ceased to be positively driven thus constituting a means for arresting the rotation of the apple or fruit and the fork carrying the fruit. The stripper $e^4$ is segmental as indicated in Fig. 6 to permit of its passing by the knife $h$ and its carrying frame in stripping the apple from the fork.

What I claim is:—

1. In a machine of the class described; a frame having a guideway thereon; a carriage operably mounted in such guideway; means for reciprocating such carriage; a fork shaft, having a gear thereon, revolubly supported on such carriage; a knife arm yieldably and elastically mounted on a suitable carrying element having a gear connected thereto and such element mounted on such carriage to traverse a cycle in which such knife traverses a path approximately half way around the fruit on such fork; means for holding such knife, during the operative portion of the path traversed thereby, in elastic and yieldable contact with the fruit on such fork; a first rack on such frame for operating the gear on such fork shaft; a second rack on such frame for operating the gear on such knife carrying element and means for holding the knife in a fixed position with its cutting edge at an angle adapted to remove the skin from the outer end of the fruit on the fork during one rotation of such fork.

2. In a machine of the class described; a frame having a guideway thereon ; a carriage operably mounted in such guideway; means for reciprocating such carriage; a fork shaft, having a gear thereon, revolubly supported on such carriage; a knife arm yieldably and elastically mounted on a suitable carrying element, having a gear connected thereto and such element mounted on such carriage to traverse a cycle in which such knife traverses a path approximately half way around the fruit on such fork; means for holding such knife, during the operative portion of the path traversed thereby, in elastic and yieldable contact with the fruit on such fork; a first rack on such frame for operating the gear on such fork shaft, such gear arranged to pass out of engagement with such rack after the fruit has been pared; means for securing a proper engagement of such rack and gear on the return of such carriage to its initial or starting position; a second rack on such frame for operating the gear on such knife carrying element and means for holding the knife in a fixed position with its cutting edge at an angle adapted to remove the skin from the outer end of the fruit on the fork during one rotation of such fork.

3. In a machine of the class described; a frame having a guideway thereon; a carriage operably mounted in such guideway; means for reciprocating such carriage; a fork shaft, having a gear thereon, revolubly supported on such carriage; a knife arm yieldably and elastically mounted on a suitable carrying element, having a gear connected thereto and such element mounted on such carriage to traverse a cycle in which such knife traverses a path approximately half way around the fruit on such fork; means for holding such knife, during the operative portion of the path traversed thereby, in elastic and yieldable contact with the fruit on such fork; a first rack on such frame for operating the gear on such fork shaft; a second rack on such frame for operating the gear on such knife carrying element and coöperating delay surfaces carried by such frame and by such element whereby the knife is held stationary and opposite the center of the fruit at the outer end of the fork and at an angle adapted to remove the skin from the outer or blow end of the fruit during one rotation of such fork.

4. In a machine of the class described; a frame having a guideway thereon; a carriage operably mounted in such guideway; means for reciprocating such carriage; a fork shaft, having a gear thereon, revolubly supported on such carriage; a knife arm yieldably and elastically mounted on a suitable carrying element, having a gear connected thereto and such element mounted on such carriage to traverse a cycle in which such knife traverses a path approximately half way around the fruit on such fork; means for holding such knife, during the operative portion of the path traversed thereby, in elastic and yieldable contact with the fruit on such fork; a first rack on such frame for operating the gear on such fork shaft and such gear arranged to pass out of engagement with such rack after the fruit has been pared; means for securing a proper engagement of such rack and gear on the return of such carriage to its initial or starting position; a second rack on such frame for operating the gear on such knife carrying element and coöperating delay surfaces carried by such frame and by such element whereby the knife is held stationary and opposite the center of the fruit at the outer end of the fork and at an angle adapted to remove the skin from the outer or blow end of the fruit during one rotation of such fork.

5. In a machine of the class described; a frame having a guideway thereon; a carriage operably mounted in such guideway; means for reciprocating such carriage; a fork shaft, having a gear thereon, revolubly supported on such carriage; a knife arm yieldably and elastically mounted on a suitable carrying element having a gear connected thereto and such element mounted on such carriage to traverse a cycle in which such knife traverses a path approximately half way around the fruit on such fork; means for holding such knife, during the operative portion of the path traversed thereby, in elastic and yieldable contact with the fruit on such fork; a first rack on such frame for operating the gear on such fork shaft; a second rack on such frame for operating the gear on such knife carrying element; coring and dividing knives supported on the frame concentrically with the axis of the paring fork and adapted to receive the fruit therefrom; a stripping mechanism adapted to engage the fruit and force the same off from the fork and over the coring knife and between the dividing knives; a lever for operating such stripping mechanism pivotally supported on the carriage and a detent on the frame adapted to engage and operate such lever as the carriage is advanced after the fruit is pared.

6. In a machine of the class described; a frame having a guideway thereon; a carriage operably mounted in such guideway; means for reciprocating such carriage; a fork shaft, having a gear thereon, revolubly supported on such carriage; a knife arm yieldably and elastically mounted on a suitable carrying element, having a gear connected thereto and such element mounted on such carriage to traverse a cycle in which such knife traverses a path approximately half way around the fruit on such fork; means for holding such knife, during the operative portion of the path traversed thereby, in elastic and yieldable contact with the fruit on such fork; a first rack on such frame for operating the gear on such fork shaft, such gear arranged to pass out of engagement with such rack after the fruit has been pared; means for securing a proper engagement of such rack and gear on the return of such carriage to its initial or starting position; a second rack on such frame for operating the gear on such knife carrying element; coring and dividing knives supported on the frame concentrically with the axis of the paring fork and adapted to receive the fruit therefrom; a stripping mechanism adapted to engage the fruit and force the same off from the fork and over the coring knife and between the dividing knives; a lever for operating such stripping mechanism pivotally supported on the carriage and a detent on the frame adapted to engage and operate such lever as the carriage is advanced after the fruit is pared.

7. In a machine of the class described; a frame having a guideway thereon; a carriage operably mounted in such guideway; means for reciprocating such carriage; a fork shaft, having a gear thereon, revolubly supported on such carriage; a knife arm yieldably and elastically mounted on a suitable carrying element, having a gear connected thereto and such element mounted on such carriage to traverse a cycle in which such knife traverses a path approximately half way around the fruit on such fork; means for holding such knife, during the operative portion of the path traversed thereby, in elastic and yieldable contact with the fruit on such fork; a first rack on such frame for operating the gear on such fork shaft; a second rack on such frame for operating the gear on such knife carrying element; coöperating delay surfaces carried by such frame and by such element whereby the knife is held stationary and opposite the center of the fruit at the outer end of the fork and at an angle adapted to remove the skin from the outer or blow end of the fruit during one rotation of such fork; coring and dividing knives supported on the frame concentrically with the axis of the paring fork and adapted to receive the fruit therefrom; a stripping mechanism adapted to engage the fruit and force the same off from the fork and over the coring knife and between the dividing knives; a lever for operating such stripping mechanism pivotally supported on the carriage and a detent on the frame adapted to engage and operate such lever as the carriage is advanced after the fruit is pared.

8. In a machine of the class described; a frame having a guideway thereon; a carriage operably mounted in such guideway; means for reciprocating such carriage; a fork shaft, having a gear thereon, revolubly supported on such carriage; a knife arm yieldably and elastically mounted on a suitable carrying element, having a gear connected thereto and such element mounted on such carriage to traverse a cycle in which such knife traverses a path approximately half way around the fruit on such fork; means for holding such knife, during the operative portion of the path traversed thereby, in elastic and yieldable contact with the fruit on such fork; a first rack on such frame for operating the gear on such fork shaft and such gear arranged to pass out of engagement with such rack after the fruit has been pared; means for securing a proper engagement of such rack and gear on the return of such carriage to its initial or starting position; a second rack on such frame for operating the gear on such knife carrying element; coöperating delay surfaces carried by such frame and by such element whereby the knife is held stationary and opposite the center of the fruit at the outer end of the fork and at an angle adapted to remove the skin from the outer or blow end of the fruit during one rotation of such fork; coring and dividing knives supported on the frame concentrically with the axis of the paring fork and adapted to receive the fruit therefrom; a stripping mechanism adapted to engage the fruit and force the same off from the fork and over the coring knife and between the dividing knives; a lever for operating such stripping mechanism pivotally supported on the carriage and a detent on the frame adapted to engage and operate such lever as the carriage is advanced after the fruit is pared.

9. In a machine of the class described, a fork carrying shaft and means for rotating the same; a knife carrying element having a knife supported thereon to elastically and yieldably engage the fruit; means for actuating the knife carrying element to move the knife around the fruit and for holding the knife out of engagement with the fruit until the knife is substantially opposite the outer end thereof; means for bringing the knife into engagement with the fruit when the knife is substantially opposite the outer end thereof; coöperating delay surfaces carried by such knife carrying element and by such actuating means for holding the knife carrying element in a fixed position with the cutting edge of the knife adapted to remove the skin from the outer end of the fruit during one rotation of such fork when the knife is opposite the outer end of the fruit and means for thereafter actuating the knife carrying element throughout the remainder of its operative travel with the knife in engagement with the fruit.

10. In a machine of the class described; a frame having a guideway thereon; a carriage operably mounted in such guideway; means for reciprocating such carriage; a fork shaft, having a gear thereon, revolubly supported on such carriage; a knife arm yieldably and elastically mounted on a suitable carrying element having a gear connected thereto and such element mounted on such carriage to traverse a cycle in which such knife traverses a path approximately half way around the fruit on such fork; means for holding such knife, during the operative portion of the path traversed thereby, in elastic and yieldable contact with the fruit on such fork; a first rack on such frame for operating the gear on such fork shaft; a second rack on such frame for operating the gear on such knife carrying element; a knife or knives supported on the frame of the machine adapted to engage and operate on the fruit as it is forced from the paring fork and coöperating therewith a stripping mechanism adapted to force the fruit off from the fork and into engagement with such knife or knives; a lever for operating such stripping mechanism pivotally supported on the carriage and a detent on the frame adapted to engage and operate such lever as the carriage is advanced after the fruit is pared.

11. In a machine of the class described; a frame having a guideway thereon; a carriage operably mounted in such guideway; means for reciprocating such carriage; a fork shaft, having a gear thereon, revolubly supported on such carriage; a knife arm yieldably and elastically mounted on a suitable carrying element, having a gear connected thereto and such element mounted on such carriage to traverse a cycle in which such knife traverses a path approximately half way around the fruit on such fork; means for holding such knife, during the operative portion of the path traversed thereby, in elastic and yieldable contact with the fruit on such fork; a first rack on such frame for operating the gear on such fork shaft, such gear arranged to pass out of engagement with such rack after the fruit has been pared; means for securing a proper engagement of such rack and gear on the return of such carriage to its initial or starting position; a second rack on such frame for operating the gear on such knife carrying element; a knife or knives supported on the frame of the machine adapted to engage and operate on the fruit as it is forced from the paring fork and coöperating therewith a stripping mechanism adapted to force the fruit off from the fork and into engagement with such knife or knives; a lever for operating such stripping mechanism pivotally supported on the carriage and a detent on the frame adapted to engage and operate such lever as the carriage is advanced after the fruit is pared.

12. In a machine of the class described; a frame having a guideway thereon; a carriage operably mounted in such guideway; means for reciprocating such carriage; a fork shaft, having a gear thereon, revolubly supported on such carriage; a knife arm yieldably and elastically mounted on a suitable carrying element, having a gear connected thereto and such element mounted on such carriage to traverse a cycle in which such knife traverses a path approximately half way around the fruit on such fork; means for holding such knife, during the operative portion of the path traversed thereby, in elastic and yieldable contact with the fruit on such fork; a first rack on such frame for operating the gear on such fork shaft; a second rack on such frame for operating the gear on such knife carrying element; coöperating delay surfaces carried by such frame and by such element whereby the knife is held stationary and opposite the center of the fruit at the outer end of the fork and at an angle adapted to remove the skin from the outer or blow end of the fruit during one rotation of such fork; a knife or knives supported on the frame of the machine adapted to engage and operate on the fruit as it is forced from the paring fork and coöperating therewith a stripping mechanism adapted to force the fruit off from the fork and into engagement with such knife or knives, a lever for operating such stripping mechanism pivotally supported on the carriage and a detent on the frame adapted to engage and operate such lever as the carriage is advanced after the fruit is pared.

13. In a machine of the class described, a frame having a guideway thereon; a carriage operably mounted in such guideway; means for reciprocating such carriage; a fork shaft having a gear thereon, revolubly supported on such carriage; a knife arm yieldably and elastically mounted on a suitable carrying element, having a gear connected thereto and such element mounted on such carriage to traverse a cycle in which such knife traverses a path approximately half way around the fruit on such fork; means for holding such knife, during the operative portion of the path traversed thereby, in elastic and yieldable contact with the fruit on such fork; a first rack on such frame for operating the gear on such fork shaft and such gear arranged to pass out of engagement with such rack after the fruit has been pared; means for securing a proper engagement of such rack and gear on the return of such carriage to its initial or starting position; a second rack on such frame for operating the gear on such knife carrying element; coöperating delay surfaces carried by such frame and by such element whereby the knife is held stationary and opposite the center of the fruit at the outer end of the fork and at an angle adapted to remove the skin from the outer or blow end of the fruit during one rotation of such fork; a knife or knives supported on the frame of the machine adapted to engage and operate on the fruit as it is forced from the paring fork and coöperating therewith a stripping mechanism adapted to force the fruit off from the fork and into engagement with such knife or knives; a lever for operating such stripping mechanism pivotally supported on the carriage and a detent on the frame adapted to engage and operate such lever as the carriage is advanced after the fruit is pared.

ALBERT J. BURNS.

Witnesses:
CLARA M. SIEVER,
ALBERT C. BELL.